United States Patent [19]

Hall et al.

[11] 4,398,293

[45] Aug. 9, 1983

[54] FREQUENCY STABILIZATION FOR TWO-MODE LASER

[75] Inventors: John L. Hall, Boulder, Colo.; Thomas M. Baer, Mountain View, Calif.; Frank V. Kowalski, Golden, Colo.

[73] Assignee: The United States of America as represented by the Secretary of Commerce, Washington, D.C.

[21] Appl. No.: 300,363

[22] Filed: Sep. 8, 1981

[51] Int. Cl.³ .............................................. H01S 3/13
[52] U.S. Cl. ...................................... 372/32; 372/29; 356/350
[58] Field of Search ....................... 372/26, 29, 38, 30, 372/81, 46, 32, 43; 356/350

[56] References Cited

U.S. PATENT DOCUMENTS 4,284,964 8/1981 Maier, Jr. .............................. 372/32

Primary Examiner—William L. Sikes
Assistant Examiner—Léon J. Scott
Attorney, Agent, or Firm—Eugene J. Pawlikowski; Alvin J. Englert

[57] ABSTRACT

Frequency stabilization is disclosed for a two-mode laser, such as a Zeeman laser. The emission frequency of the laser is servo-stabilized to the center of the atomic gain curve to provide a stable laser reference frequency that is independant of time and enviromental operating conditions. Stabilization in a longitudinal-field Zeeman laser is achieved by utilizing the mode-pulling effect which makes the frequency difference between the two circular polarization components have a parabolic dependence on the optical frequency of the laser. The detected intermode beat frequency from the laser is subjected to digital phase-sensitive, drift-free integration, utilizing a reversible counter, to provide a cumulative count with a rate of increase corresponding to the displacement of the average wavelength from the atomic center wavelength and an analog error-correction signal is generated therefrom which is coupled to the laser. The error-correction signal is processed and coupled to the piezoelectric crystal which controls the emission frequency of the laser for fast laser frequency correction control, and may be also processed and coupled to the heater coil on the laser for thermally providing slow frequency correctional control.

35 Claims, 6 Drawing Figures

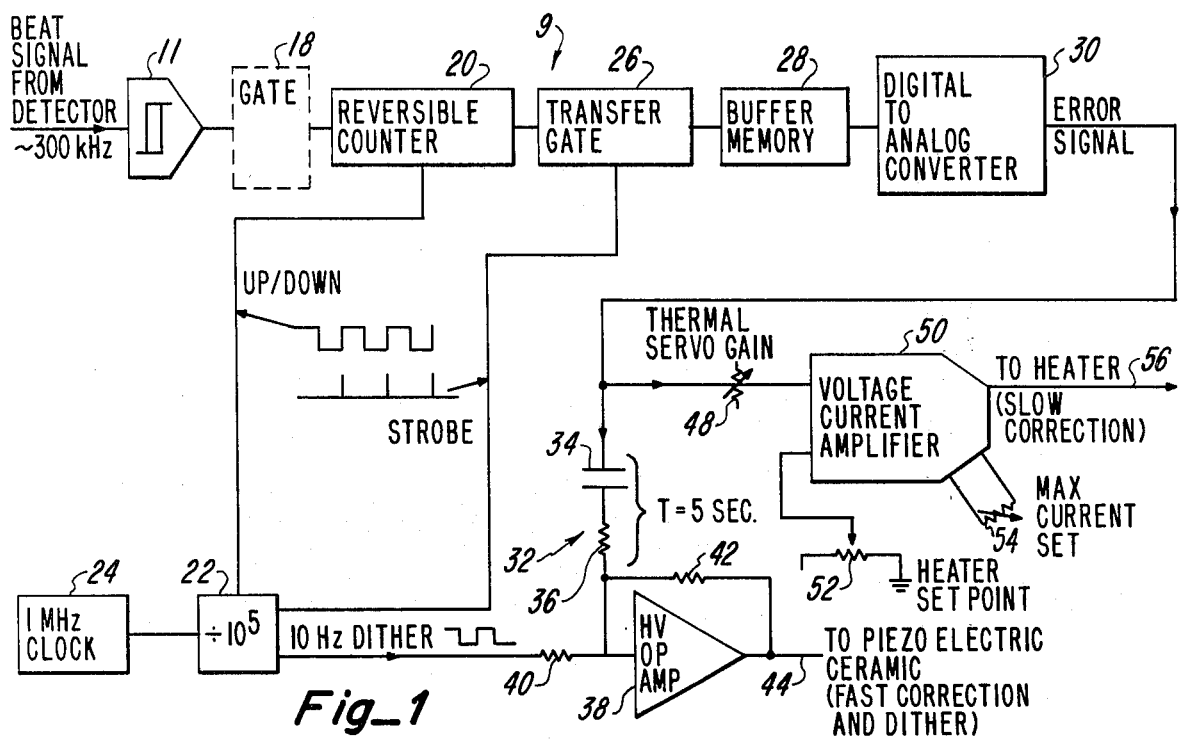
Fig_1
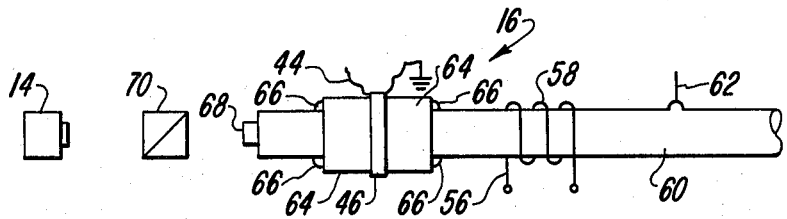
Fig_2
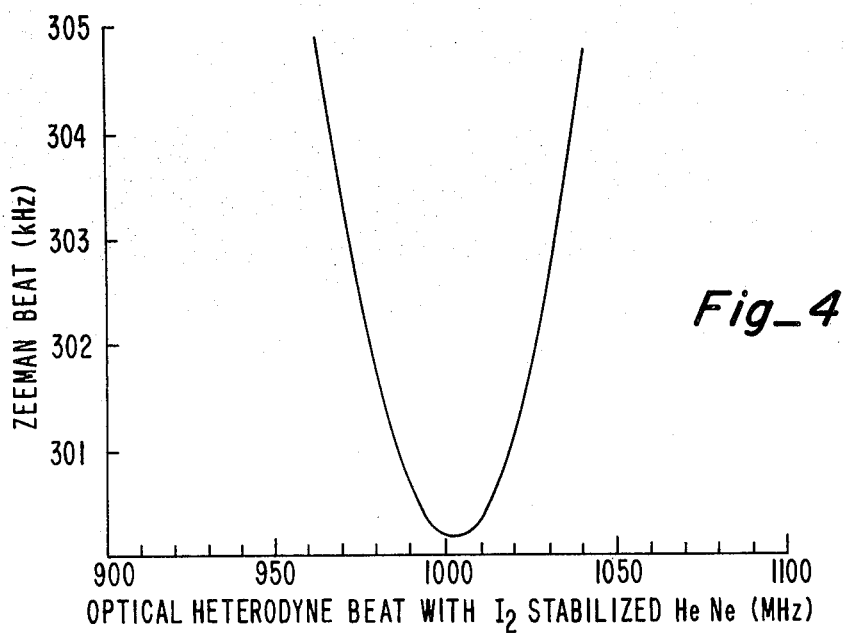
Fig_4

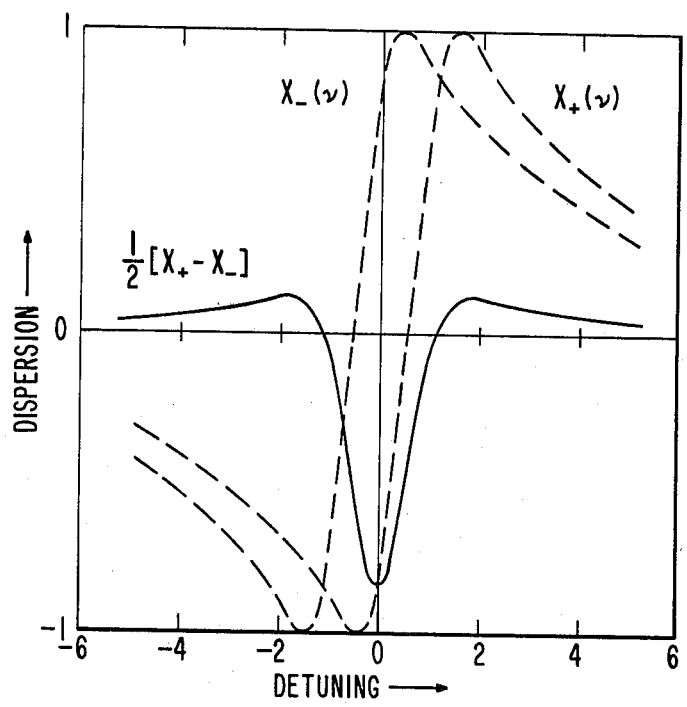
Fig_5
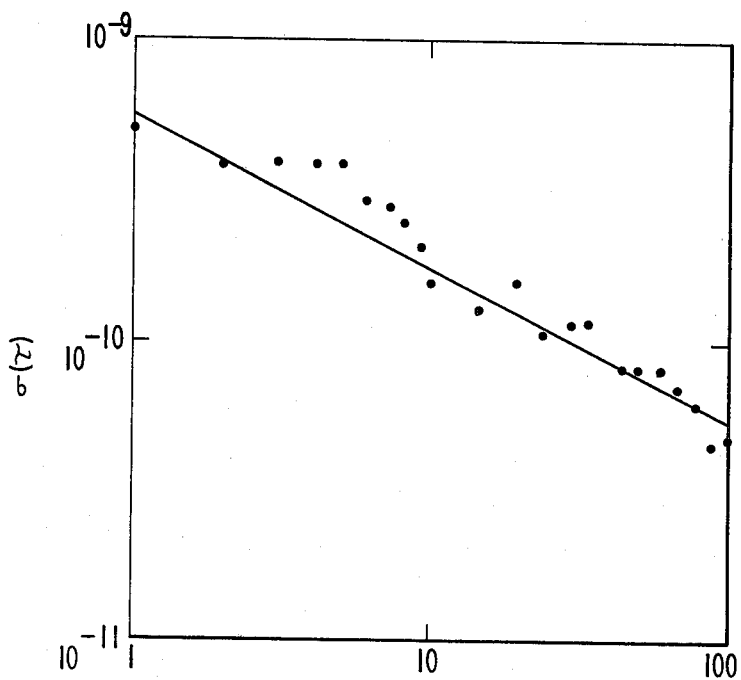
Fig_6
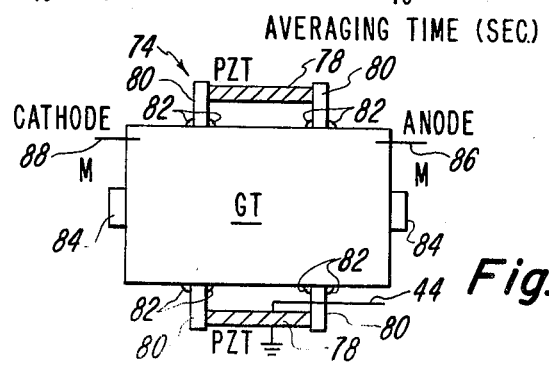
Fig_3

FREQUENCY STABILIZATION FOR TWO-MODE LASER

FIELD OF THE INVENTION

This invention relates to laser frequency stabilization and, more particularly, relates to frequency stabilization of a two-mode laser such as a Zeeman laser.

BACKGROUND OF THE INVENTION

The properties and characteristics of lasers are now known and techniques for stabilizing laser systems have likewise been heretofore suggested and/or developed. One such stabilizing technique is described, for example, in "Laser Frequency Stabilization by Means of Saturation Dispersion", by G. Kramer, C. O. Weiss and J. Helmcke, Z. Naturforsch. Teil A:30,1128 (1975) wherein a 3.39 μm He-Ne laser was frequency stabilized utilizing a dispersion frequency stabilization scheme which included an external stabilized reference laser (as a frequency reference for heterodyne detection of frequency pulling effects) and a reversible counter in the control system. Performance, however, was degraded due to frequency noise intrinsic to the use of a separate laser for the heterodyne reference function.

The properties and characteristics of two-mode lasers, such as Zeeman lasers wherein the two modes are symmetrically disposed around the atomic line center, are also now known, and frequency stabilization techniques have likewise been heretofore suggested for such lasers.

Frequency stabilization of the Zeeman laser is shown, for example, in U.S. Pat. No. 3,534,292. In this system, the cavity of a two frequency Zeeman-split laser is modulated in length by a piezoelectric element to produce a modulated difference frequency that is discriminated to provide a signal having AC and DC components with the AC component being detected to provide an error-correction signal that is coupled to the piezoelectric element, and with the DC component being fed back to the laser to control the magnetic field applied to the laser.

It is has also been heretofore suggested that a heater wrapped around the structural elements of the resonator of a laser could utilize the control voltage from a cavity length servo to cause the heater to be switched off and on for thermally controlling cavity length so that the main piezoelectric servo continually operates about the center of the dynamic range ["Laser Frequency Stabilization: Combined Integrating Thermal-Proportional Servos", Clark, Applied Optics, Volume 15, No. 6, page 1375 (1976)].

SUMMARY OF THE INVENTION

This invention provides improved frequency stabilization for a two-mode laser such as a Zeeman laser. The detected intermode beat frequency from the laser is subjected to digital integration to provide a cumulative count with a rate of increase corresponding to the displacement of the oscillator frequency from the center of the laser gain curve, and an analog error-correction signal is generated therefrom for oscillator frequency correction.

It is therefore an object of this invention to provide an improved frequency stabilization system and method for a two-mode laser.

It is another object of this invention to provide an improved frequency stabilization system and method for a two-mode laser utilizing digital integration of the detected beat frequency from the laser;

It is yet another object of this invention to provide an improved frequency stabilization system and method for a two-mode laser providing cumulative information for correction of laser frequency errors.

It is still another object of this invention to provide an improved frequency stabilization system and method for a Zeeman laser.

It is yet another object of this invention to provide an improved two-mode laser having frequency stabilization.

With these and other objects in view, which will become apparent to one skilled in the art as the description proceeds, this invention resides in the novel construction, combination, arrangement of parts and method substantially as hereinafter described, and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a combined block and electrical schematic illustrating frequency stabilization according to this invention;

FIG. 2 is a partially exploded side view illustrating, in essence, a longitudinal-field Zeeman laser which can be frequency stabilized by this invention;

FIG. 3 is a partial side view illustrating, in essence, the now preferred form of a two-mode laser which can be frequency stabilized by this invention;

FIG. 4 is a graphical presentation illustrating a least squares fitted parabola for measured Zeeman beat frequencies between left and right circularly polarized waves as a function of the laser's optical frequency, wherein the abscissa is the beat frequency between the Zeeman laser and an $^{129}I_2$ stabilized He-Ne laser locked to the B peak;

FIG. 5 is a graphical presentation wherein the dotted lines illustrate the dispersion parameters for the left $\chi+$ and right $\chi-$ circularly polarized standing waves as a function of detuning from line center (in normalized units), and wherein the solid curve is the difference between the two functions, which is approximately proportional to the frequency difference between the two standing waves (the central minimum portion of the solid curve being the region where the data of FIG. 4 were taken); and FIG. 6 is a graphical presentation of Allan variance of the He-Ne beat with an $I_2$ stabilized laser.

DESCRIPTION OF THE INVENTION

The laser system frequency-stabilized according to this invention, is based on the physical principle that the beat frequency between two modes oscillating in the same laser cavity depends (slightly) on the absolute laser frequency. Such a tuning dependence arises from the dispersion of the nearly resonant atoms, which produces a frequency offset between the actual oscillation frequency of the laser and the resonance frequency of the cavity (including the nonresonant part of the gain medium). This frequency offset between oscillation frequency and cavity frequency produces a frequency offset with opposite signs on the two sides of resonance, and the frequency pulling effect passes through an extremum when the laser is tuned to the exact resonance with the center of the atomic gain curve.

The device of this invention is thus a two-mode laser with the two modes symmetrically disposed around the atomic line center. Both modes are pulled from their cavity frequency by the atomic dispersion, but in opposite senses, and the difference frequency between the two oscillating modes reflects the difference in frequency pulling for the two modes. While the frequency pulling itself is odd-symmetric around the atomic center frequency, the difference in the two frequency pulling effects forms a parabolic curve of even symmetry centered on the atomic frequency.

Suitable laser systems to exploit this effect may therefore be a two-mode laser of linear polarization oscillating in symmetrically detuned adjacent cavity modes, a transverse field Zeeman-split laser medium oscillating in two polarizations of a single longitudinal cavity order, or preferably a longitudinal-Zeeman laser in which the two oscillating modes are of opposite senses of circular polarization. In the latter case, the modes can be mixed by a linear polarizer to give a photo beat signal, and stabilization for such a system is set forth hereinafter (it being realized that stabilization for other two-mode lasers which exhibit pushing or pulling effects with optical tuning could likewise be effected in a similar manner utilizing this invention.

Referring now to the drawings, a frequency stabilization system 9 is shown in FIG. 1 to include a Schmitt trigger 11 for receiving the beat signal from detector 14 of laser 16 (as shown in FIG. 2, and which is similar to that shown in U.S. Pat. No. 3,534,292). Trigger 11 provides a string of logic pulses which are coupled through a gate 18 (optional) to a reversible counter 20 (i.e. an up and down counter). Counter 20 is controlled by timing pulses from frequency divider 22 (a divide by $10^5$ divider) connected to a clock pulse generator 24 (a 1 MHz clock). By this arrangement, the direction of the reversible counter is controlled so that the laser-mode beat frequency input to the counter is counted up during one-half of the square wave cycle and down during the other half.

After one complete cycle of the 10 Hz square wave, a number proportional to the difference between the beat frequency measured in these two intervals resides in the counter. Once per cycle, this number (proportional to the local slope of the curve as shown in FIG. 4) is strobed through transfer gate 26 (which receives a strobe input from frequency divider 22 for this purpose) into buffer memory, or storage register, 28 of digital to analog (D/A) converter 30.

The analog output from D/A converter 30 is an error-correction signal which is coupled through filter 32 (composed of capacitor 34 and resistor 36) to operational amplifier 38 (which also receives a 10 Hz dither input signal through resistor 40 and has a feedback circuit to the input through resistor 42). The output from amplifier 38 is coupled on lead 44 to the piezoelectric element 46 of the laser for fast frequency correction. As also shown in FIG. 1, the error-correction signal may also be coupled through thermal servo gain 48 to voltage/current amplifier 50 (which amplifier has a heater set point resistor 52 and maximum current set resistor 54). The output from amplifier 50 is then coupled on lead 56 to the heater coil 58 of the laser for thermally causing slow frequency correction. The use of the thermal control for slow frequency correction is optional. If not utilized, then all frequency correction is through the piezoelectric control path (in which event the RC network filter 32 would be reconfigured to provide a suitable DC transmission path).

A longitudinal-field Zeeman laser 16 is shown in FIG. 2, which laser may be frequency stabilized by the frequency stabilization system as shown in FIG. 1. As shown, laser 16 includes a detector 14, which, as brought hereinabove, supplies the beat signal from the laser to stabilization system 9. In addition, the output of amplifier 50 (as shown in FIG. 1) is coupled on lead 56 to heater coil 58 (which is preferably Nichrome wire), which coil is wrapped around laser tube 60 (preferably wrapped around a 2 cm length of the plasma tube outside the active region and having a response time of $\sim 5$ sec), which tube also has anode connection 62 attached thereto.

Two glass sleeves 64 are received on laser tube 60, and fastened in place, as by epoxy 66, at each side of piezoelectric element, or crystal 46. An external coil or permanent magnet supplies a $\approx 50$ G magnetic field over the active length of the plasma.

The output from laser tube 60 is directed through mirror 68 and linear polarizer 70 to detector (photodiode) 14 where the beat signal is detected by monitoring (through the polarizer) the laser light emitted from the rear reflector in the laser).

FIG. 3 illustrates a now preferred form of the Zeeman laser 74 that can be frequency stabilized by this invention. As shown, the piezoelectric element, or transducer, 78 is positioned adjacent to the glass tube (GT) by glass or ceramic drivers 80 which are fastened on the glass tube, as by epoxy 82. Mirrors 84 are located on opposite sides of the glass tube and anode connection 86 is at one side of the tube and cathode connection ois at the other side of the tube. No heater is utilized in this embodiment, but a polarizer and detector would be utilized in a manner similar to that of the laser described in connection with FIG. 2.

When a longitudinal magnetic field is applied to an internal mirror single-mode He-Ne laser, the normally linearly polarized mode splits into two oppositely circularly polarized modes that oscillate at slightly differenct optical frequencies (an $\sim 300$ KHz difference at 50 G). If these two circularly polarized modes are mixed by a linear polarizer, a beat signal can be observed at the difference frequency. At fixed magnetic field, this difference frequency changes as these two closely spaced modes are tuned across the gain profile. At the optical frequency corresponding to the center of the laser gain curve, there is a pronounced minimum in the beat frequency. A plot of the observed intermode beat frequency as a function of the laser output frequency is shown in FIG. 4. The abscissa in FIG. 4 is the optical beat frequency between Zeeman laser and He-Ne laser stabilized to the B peak of $^{129}I_2$.

The frequency difference between left and right circularly polarized laser oscillation modes is a result of different optical path lengths for the two polarizations in the laser resonator. This situation arises because the indices of refraction for the two polarizations are different due to the Zeeman splitting of the atomic states of neon.

The g factors for the upper and lower states involved in the lasing transition are nearly equal ($g_{av} = 1.298$), differing by only five parts in a thousand. Thus, in the presence of a longitudinal magnetic field, the atomic transition is just split into a gain doublet corresponding to the two allowed transitions, $\Delta m = \pm 1$. The doublet is symmetrically positioned about the zero-magnetic-field atomic line, each component being shifted by the amount $g\,\mu_o B/h$, where g is the gyromagnetic ratio, $\mu_o$ is the Bohr magneton, B is the magnetic field strength, and $2\pi h$ is Planck's constant. Each circularly polarized wave interacts primarily with its own component of the atomic doublet and experiences an index of refraction n changed by the anomalous dispersion of its component of the doublet. For example, the left circularly polarized wave experiences a resonant change in the index of refraction due to, and centered on, the higher frequency component of the atomic Zeeman doublet. These resonant changes in the index of refraction associated with the two anomalous dispersions for the two standing waves are represented in FIG. 5.

The standing wave frequency for either polarization is determined by $$\omega \pm = 2\pi \frac{c}{2Ln\pm} \cdot N,$$

where L is the resonator length, N is the axial quantum number of the mode, c is the speed of light, and $n\pm$ is the index of refraction for either polarization. The beat frequency for the two modes is thus determined by $$\Delta\omega = \omega_+ - \omega_- =$$

$$2\pi \frac{c}{2L} \left( \frac{1}{n_+} - \frac{1}{n_-} \right) N \propto \omega_o [\chi + \{v\} - \chi - \{v\}],$$

where $\omega_o$ is the corresponding zero-magnetic-field resonance of the cavity, and $\chi+(v)$ and $\chi-(v)$ are the dispersion functions for the left and right circularly polarized waves, respectively. A more complete calculation of $\Delta\omega$ must include other dispersive terms because of the nonlinear atomic polarization in the laser cavity.

The difference between the dispersion functions for the left and right circularly polarized standing wave, which is approximately proportional to the beat frequency, is the solid curve plotted in FIG. 5. The central minimum of the solid curve corresponds to the region where the data plotted in FIG. 4 were taken. The theory of stabilization of this invention, in agreement with experiment, predicts a parabolic beat frequency dependence upon detuning.

Because of the symmetry of the magnetic field-induced Zeeman frequency shifts, the position of the central minimum of the curve shown in FIG. 5 is independent of the magnetic field strength and is located at the line center. Thus, minimizing $\Delta\omega$ provides a convenient method of insuring that the laser is oscillating at the center of the laser gain curve.

To use the signal plotted in FIG. 4 as an error signal for controlling the laser frequency, it is useful to generate a function that changes sign as the laser frequency passes through the line center, or lock point. This is accomplished in this invention by use of the convenient technique of dithering the laser frequency to produce the first derivative that satisfies this condition.

In the interests of convenience and long laser tube life, a commercially available He-Ne laser tube with internal mirrors can be utilized (a Spectra-Physics, Model 155 has been utilized, for example) with two glass sleeves and a small piezoelectric crystal being attached to the laser tube using epoxy cement. When a voltage is applied to the piezocrystal, it exerts sufficient force to stretch the laser capillary tube and thus lengthen the cavity resonator. Typically, the dither voltage is a 10 Hz square wave of 20 V amplitude, which results in an optical frequency modulation of $\sim 8$ MHz peak to peak.

This technique of stretching the laser tube also allows a fast response correction to drifts in the laser frequency by adding the correction signal to the dither voltage applied to the piezoelectrical crystal. A fast response optical tuning range of $\sim \pm 50$ MHz was obtained by offsetting the square wave dither within the $\pm 150$ V range of the driver amplifier. The larger (long-term) frequency corrections may be provided by a thermal servo that can increase the length of the Pyrex laser tube by $\sim 5$ fringes.

This digital method of obtaining the error signal utilizes digital integration of the correction signal to track out the error. Since the reversible counter is not reset after each dither cycle, the residual counts remain and are accumulated in subsequent dither cycles. The error signal continues to integrate in this way until the servo corrects the laser frequency to line center, and no more counts are added to the accumulated error signal. In operation, the fast correction servo (piezoelectric crystal) removes an initial error of the laser frequency in a few seconds. The slow heater servo (when utilized) gradually reduces the error signal accumulated in the counter while the fast servo maintains the laser frequency at the line center. The settling time of this locking scheme is much faster than those employing only a heater as a servo mechanism. An additional long-term integration of the error input to the thermal servo could be utilized but does not seem to be necessary. In addition, the lock point is insensitive to magnetic field and tube current variations, and there is only one lock point across the gain profile, which lock point appears relatively insensitive to optical feedback.

The servo system operates without a dc error after equilibrium is reached: Although the storage register may then contain a finite count that provides the static offset necessary to tune the laser to the lockpoint, there is no further increase or decrease in the stored count with time, and therefore, there is no frequency error. In effect, the digital integration scheme provides infinite dc gain.

A useful measure of the temporal characteristics of a laser's frequency stability is provided by the Allan variance (D. W. Allan, Proc. IEEE 54, 221 (1966)). The Allan variance for $n=2$ is equivalent to $$\sigma\{\tau\} = \frac{1}{f_A} \cdot \left[ \frac{1}{N-1} \sum_{i=1}^{N=1} (f_{i+1} - f_i)^2 \right]^{\frac{1}{2}}$$

where $f_A$ is the mean laser frequency, N is the number of immediately successive frequency measurements taken, and $f_i$ is the ith frequency measurement taken by counting during an interval $v$.

FIG. 6 shows the measured Allan variance of a Zeeman laser frequency stabilized according to this invention. The data were obtained by measuring the beat signal between the Zeeman laser and an iodine-stabilized He-Ne laser. This graph indicates a relative stability of better than one part in $10^9$, for an averaging time of 1 sec. The attack time of the servo was $\sim 1$ sec. Since the performance of the I$_2$-stabilized laser is considerably better than this value, it can be safely assumed that the Zeeman stabilized laser accounts for almost all the Allan variance.

The small increase in the Allan variance $\tau \sim 5$ sec is felt to be associated with servo phase errors in the crossover region where the thermal servo is beginning to dominate over the piezochannel. The significance of the error-free digital integration of this invention may be appreciated from the behavior of the curve at long times ($\tau \approx 100$ sec): there is minimal departure from the pure $\tau^{-\frac{1}{2}}$ behavior expected for the averaging of a random noise process.

The lock point of the laser is found to be $(1005 \pm 1.0)$ MHz to the red of the B peak of $^{129}$I$_2$. Using the CCDM (Comite Consultatif pour la Definition du Metre, 5th Session, June 1973 (Bureau International des Poids et Mesures, Sevres, France 92310, 1973), p. M26) recommended values (c=299 792 458 m/sec, and $\nu(B)$=437 613 203 MHz, both with $\pm 4 \times 10^{-9}$ fractional accuracy), the locking point as $\nu_{lock}$=473 612 198$\pm$2 MHz is obtained. The corresponding stabilized wavelength is $\nu_{lock}$=632 991 420$\pm$0.000 003 nm ($\pm 4.5 \times 10^{-9}$ fractional accuracy). Note that the wavelength uncertainty comes almost entirely from the uncertainty in $\lambda(B)$, which in turn may be traced to limitations of the legal meter definition based on the radiation from an $^{86}$Kr discharge lamp.

The stabilization wavelength of the Zeeman laser stabilized according to this invention may be compared with the wavelength produced by use of the Lamb-dip discriminant. Measurements at the Bureau International des Poids et Measures show the stabilized wavelength of a new Lamp-dip-laser device to be 632 991 410 nm, drifting to 632 991 430 nm 3 years later near the end of the plasma tube life. This 15 MHz red shift with age is primarily because of loss of the helium fill gas through sputtering and diffusion. The inferred wavelength for the plasma tube utilizable with this invention is appropriately within this range.

The locking algorithm according to this invention produces the same line center position as the lamb-dip lock, to within the uncertainty of $\sim \pm 7$ MHz. Pressure shift data [(+16$\pm$4) MHz/Torr] may be used to estimate that the zero pressure line center of the $^{20}$Ne3S$_2 \rightarrow$2P$_4$ transition lies $\sim$50 MHz red of locked wavelength of the system of this invention. It has also been found within $\sim$1.0 MHz uncertainty, there is no observable frequency shift of the laser frequency lock point for magnetic field values from 40 to 110 G. The lock point does not appear to depend on tube current within the range providing single axial-mode operation.

For the correct operation of the frequency stabilization system, it was necessary that the laser run single mode over a 100 to 200 MHz range around the lock point. This mode of operation was achieved in the laser tubes by lowering the discharge current. Any amplitude modulation of the laser output due to the beat signal between the two oppositely cirularly polarized modes can be eliminated by selecting either polarization with a $\lambda$/4 plate and a linear polarizer. Residual amplitude modulation below 1% has been easily obtained.

The digital technique described above, whereby the signal is integrated digitally before being converted to an analog form, provides a simple and fundamentally drift-free way of recovering the necessary error signal. However, the extremely high SNR of the beat frequency signal is not being optimally employed. For example, conventional digital logic components easily operate at 100-fold higher frequency than a 300 KHz beat frequency. By phase-locking to the optical beat signal, an electronic oscillator operating at 100-fold higher frequency could then be counted reversibly. This would effect a dramatic reduction in the $\pm 1$ count digitizing noise that now contributes appreciably to the short-term frequency noise of the stabilized laser. Alternatively, reciprocal frequency (period) measurement techniques could also be usefully employed.

Because of the nonlinear amplifier response, it is difficult to insure perfect symmetry in the transition region when the input square waveform has an excessive rate of rise. A slope-controlled waveform of the piezoelectric crystal would be helpful to minimize ringing and overshoot. Alternatively, system accuracy could be improved by providing a digitally operated gate (such as gate 18 as indicated in FIG. 1) in the counting line that would inhibit counting in either direction for a few milliseconds after each transition of the dither wave. In addition, a sine wave could be used in lieu of a square wave, and such a waveform could be very accurate since it can be checked for distortion/errors. Certainly a sinusoidal modulation would reduce the problems involved with the phase-locked oscillator of a Lambdameter, if one of the present lasers were to be used as reference.

Also, it has been noted that a significant noise increment arises from the imperfect crossover between the fast piezo and slow thermal correction channels. This in instrinsic to use of a thermal servo driver amplifier in that the thermal expension is quadratic in the drive current ($\Delta l/l \alpha i^2 R$), and so the effective gain through the thermal branch of the servo loop depends on the set point and room temperature changes after locking. The drive amplifier already is provided with a separate dc bias point control, which can also be used to scan the laser frequency when the servo is disabled. By setting it near the middle of the thermal operating range before activating the servo, the intrinsic heating/cooling rate asymmetry can be reduced to an acceptable scale. To reduce the influence of the gain variation with operating point, cross over between the two transducers is at a closed loop gain $\geq 10\times$ so that the modest gain variations of the thermal servo channel do not have a catastrophic effect on the closed loop dynamics. An analog square root module between the amplifier (which sums the set point and error inputs) and the heater-driving power amplifier could also be utilized. This, combined with the quadratic transducer response ($\alpha i^2 R$), would result in a linear error input/transducer output response function independent of the operating point, thus allowing design of a more optimal crossover network.

As can be appreciated from the foregoing, the frequency stabilization system and method of this invention is based on digital phase-sensitive integration of the intermode beat frequency, switched synchronously with the applied frequency modulation. In this system, a frequency modulation waveform deliberately places the laser oscillation frequency partway up the beat frequency-vs-optical-frequency parabola. During this time, a reversible counter is "up-counted" with the laser's beat frequency. On the second half of the modulation cycle, the laser is placed in a nominally symmetric position on the other side of the tuning parabola. During this modulation phase, the beat frequency is "down-counted". At the end of one complete modulation cycle, the remaining counts accumulated in the reversible counter are strobed into a latch, and then converted into an analog voltage by a digital-to-analog converter. This converter output serves as the error signal for the servo system during the next modulation cycle, in turn being replaced at the end of the next full cycle.

It should therefore be seen that this error signal output from the converter represents a sampled version of the time-integrated beat frequency difference between the two modulation states and therefore carries information about the average laser frequency relative to the center of the tuning parabola. For example, if the average frequency of the laser is not the symmetry center of the parabolic beat frequency tuning curve, each complete modulation cycle will leave a few residual counts in the reversible counter. As this counter is not reset after each cycle, the error counts continue to accumulate until ultimately the converter output through the servo amplifier system is able to drive the average laser frequency to the correct value. Because of this digital integration, the system has basically infinite DC loop gain while totally avoiding drift and offset problems intrinsic to analog integration techniques.

Precise and sensitive control of commercially available long-life laser tubes can be achieved using the frequency stabilization of this invention. Rapid control of the laser frequency is achieved by use of a piezoelectric ceramic tube around the laser tube so as to stretch or compress the length of the glass envelope in response to voltages applied to the piezoelectric element, while a convenient transducer to effect slow tuning of the laser is optionally achieved through the use of heater resistors along the capillary tube (the resulting thermo expansion tunes the laser a few cavity orders with a time constant of a few 10's of seconds).

In summary, the stabilization technique for a Zeeman laser is based on locking to the minimum of the beat frequency between the two Zeeman-split circular polarization modes as the absolute optical frequency is tuned through the center of the neon's gain curve. By using reversible counting and digital/analog conversion to implement the lock, absolute frequency reproducibility of $\pm 1$ MHz ($\pm 2 \times 10^{-9}$) is directly achieved. Frequency stability is better than $10^{-10}$ for 100 seconds averaging time. Over the life of the plasma tube, a total frequency change, possibly as much as $5 \times 10^{-8}$ to the red, may be expected as the gradually decreasing helium gas pressure reduces the pressure shift. Thus, the two-mode laser device frequency stabilized by this invention should be able to reliably deliver a reference wavelength near the $10^{-9}$ reproducibility level for long periods of time utilizing a device that is relatively inexpensive.

A two-mode laser frequency stabilized according to this invention could be useful in a variety of laser utilized, or utilizable, applications, including (but not meant to be limited to) interferometric testing of optical surfaces, wavelength reference or calibration apparatus, numerically controlled machining using interferometers, measuring dye laser wavelengths using interferometric techniques, laser strainmeters, internal mirror CW gas lasers, and/or Zeeman ring laser gyros for inertial navigation.

It should therefore be apparent, from the foregoing, that this invention provides an improved system and method for providing frequency-stabilized laser radiation.

What is claimed is:

1. A frequency stabilization system for a laser having two modes oscillating in the same laser with the beat frequency therebetween being dependent upon the frequency offset of the oscillator frequency from the center of the laser gain curve, said system comprising:

digital integration means for receiving said beat frequency from said laser and producing therefrom a digital output indicative of the displacement of the oscillator frequency from the center of the laser gain curve; and converter means for receiving said digital output from said digital integration means and responsive thereto producing an analog error-correction signal to enable centering of said oscillator frequency with respect to the center of said laser gain curve.

2. The system of claim 1 wherein said beat frequency has a parabolic dependence on said oscillator frequency, and wherein said digital integration means provides a digital output indicative of displacement of the average oscillator frequency from the center of said parabola.

3. The system of claim 1 wherein said digital integration means includes a reversible counter.

4. The system of claim 3 wherein said system includes timing means for causing said counter to count in one direction during one portion of the cycle of said beat frequency and in the opposite direction during a second portion of said cycle of said beat frequency whereby a count is produced at the end of said cycle that is indicative of said frequency offset.

5. The system of claim 4 wherein said direction of counting of said reversible counter is synchronized by said timing means with said beat frequency so that the positive portion of the wave form of said beat frequency is counted in one direction and the negative portion of said wave form is counted in the opposite direction.

6. The system of claim 4 wherein said count is retained in said reversible counter at the end of each cycle so that the count is cumulative over a number of cycles.

7. The system of claim 4 wherein said timing means includes clock means for providing an output at a predetermined frequency to synchronize said counter to count in said one direction during one-half of said cycle of said beat frequency and count in said opposite direction during the other half of said cycle of said beat frequency.

8. The system of claim 7 wherein said clock means includes a timing pulse generator and divider means, with said divider means providing said output at said predetermined frequency.

9. The system of claim 1 wherein said system includes transfer means connected between said digital integration means and said converter means for controlling transfer of said digital output from said digital integration means to said converter means.

10. The system of claim 1 wherein said counter means includes a buffer memory and a digital-to-analog converter.

11. The system of claim 1 wherein said system includes filtering and amplifying means connected with said converter means, said filtering and amplifying means providing an analog error-correction signal suitable for adjusting said oscillator frequency towards said center of said laser gain curve.

12. The system of claim 11 wherein said filtering and amplifying means includes an RC filter and an operational amplifier.

13. The system of claim 1 wherein said laser includes thermal means for heating said laser, and wherein said system includes thermal control means connected with said converter means to receive said analog error-correction signal therefrom and responsive thereto enabling control of said heating of said laser by said thermal means to thereby adjust said oscillator frequency towards said center of said laser gain curve.

14. The system of claim 13 wherein said thermal control means includes a thermal servo gain and a voltage/current amplifier.

15. A frequency stabilization system for a laser having two modes oscillating in the same laser cavity with the beat frequency therebetween being dependent upon the frequency offset of the emission frequency of the oscillator from the center of the atomic gain curve, said system comprising:
  input means for receiving said beat frequency from said laser;
  timing means having an output related to said beat frequency;
  digital phase-sensitive integration means connected with said timing means and with said input means to receive said beat frequency therefrom, said digital integration means providing a digital output corresponding to the displacement of said emission frequency of said oscillator from the center of said atomic gain curve;
  transfer means connected with said timing means and with said digital integration means for controlling said digital output from said digital integration means;
  converter means connected with said transfer means to receive said digital output from said transfer means and responsive thereto providing an analog error-correction signal capable of causing adjustment of said emission frequency towards to the center of said atomic gain curve; and
  output means connected with said converter means to couple said error-correction signal from said system.

16. The system of claim 15 wherein said input means includes a Schmitt trigger, and wherein said digital integration means includes a reversible counter.

17. The system of claim 15 wherein said converter means includes a digital-to-analog converter and a latch connected with said transfer means.

18. The system of claim 17 wherein said timing means includes means for causing said digital output to be strobed into said latch after each cycle of said beat frequency, and for causing said digital output strobed into said latch to be converted to said analog error-correction signal.

19. The system of claim 15 wherein said output means includes a filter connected with said counter means to receive said analog error-correction signal therefrom, and an operational amplifier connected with said filter and said timing means.

20. The system of claim 19 wherein said output means includes a thermal servo gain control means connected with said converter means to also receive said analog error-correction signal therefrom.

21. A stabilized two-mode laser, comprising:
  laser means having frequency adjusting means for adjusting the emission frequency of the output from said laser means, cavity means with two modes oscillating therein with the beat frequency between said two modes being dependent upon the frequency offset of said emission frequency from the center of the laser gain curve, and detector means for detecting said beat frequency;
  digital integration means for receiving said beat frequency from said detector means and providing therefrom a digital output indicative of the displacement of the emission frequency from the center of the laser gain curve; and
  converter means for receiving said digital output from said digital integration means and responsive thereto providing an analog error-correction signal, said converter means being connected with said frequency adjusting means for causing centering of said emission frequency with respect to the center of said laser gain curve.

22. The laser of claim 21 wherein said frequency adjusting means is a piezoelectric element, and wherein said error-correction signal from said converter means is coupled to said piezoelectric element to adjust the emission frequency of said laser toward the center of said laser gain curve to thereby servo-stabilize said laser.

23. The laser of claim 22 wherein said laser means includes heater means, and wherein said error-correction signal is also coupled to said heater means for thermally adjusting said emission frequency of said laser whereby said piezoelectric element provides a relatively fast adjustment of said emission frequency and said heater means provides a relatively slow adjustment of said emission frequency.

24. The laser of claim 21 wherein said laser has a frequency stability of <1 MHz ($<2\times 10^{-9}$) for an averaging time of 1 second.

25. The laser of claim 21 wherein said digital integration means includes a reversible counter, and wherein said laser includes transfer means and timing means having an output related to said beat frequency, said timing means being connected with said reversible counter and said transfer means to cause said reversible counter to be synchronized with said beat frequency whereby said counter counts in one direction during one-half cycle of said beat frequency and in the other direction during the other half cycle of said beat frequency, with said transfer means causing said count remaining at the end of each cycle to be strobed to said converter means.

26. The laser of claim 25 wherein said converter means includes a buffer memory and a digital-to-analog converter with said buffer memory receiving said count strobe from said counter at the end of each cycle and said converter then converting said count into said error-correction signal.

27. The laser of claim 26 wherein said laser includes output means including a filter and an operational amplifier, said filter receiving said error-correction signal from said digital-to-analog converter and said operational amplifier being connected with said timing means to receive a dither output therefrom, the output from said operational amplifier being coupled to said piezoelectric element.

28. A method for frequency stabilization of a laser providing an oscillator output frequency and having two modes oscillating in the same cavity, said method comprising:
  determining the beat frequency between said two modes oscillating in said cavity of said laser;
  digitally integrating said determined beat frequency with said digital integration result being indicative of the displacement of said oscilator frequency of said laser from the laser gain curve;

converting said digital integration result to an analog error-correction signal; and utilizing said error-correction signal to adjust said oscillator output frequency.

29. The method of claim 28 wherein said beat frequency has a parabolic dependence on said oscillator frequency, and wherein said oscillator frequency is caused to be shifted partway up on said parabola prior to digital integration of said beat frequency.

30. The method of claim 28 wherein said digital integration of said beat frequency includes counting in one direction during a first half cycle of the beat frequency and counting in the opposite direction during the second half cycle of the beat frequency so that the count remaining at the end of a complete cycle is indicative of displacement of said oscillator frequency from the center of said laser gain curve.

31. The method of claim 28 wherein converting of said digital integration result includes strobing of said result into a latch and then converting the digital output in said latch into said analog error-correction signal.

32. The method of claim 28 wherein said analog error-correction signal is utilized by applying said signal to a piezoelectric element in said laser for fast frequency adjustment of said oscillator frequency.

33. The method of claim 28 wherein said analog error-correction signal is utilized by applying said signal to a heater for thermal control of frequency to thereby effect slow frequency adjustment of said oscillator frequency.

34. A method for frequency stabilization of a laser providing an oscillator output frequency the adjustment of which is controlled by a piezoelectric element with said laser having two modes oscillating in the same cavity, said method comprising:

determining the beat frequency between said two modes oscillating in said cavity of said laser, said beat frequency being dependent upon the frequency offset of said oscillator frequency from the center of the laser gain curve;

applying the beat frequency to a reversible counter with the counter counting up during one-half cycle of the beat frequency counting down during the second half cycle of the beat frequency;

strobing the count in said reversible counter into a latch at the end of each cycle of the beat frequency;

converting the count in the latch to an analog error-correction signal; and applying the analog error-correction signal to said piezoelectric element of said laser to cause adjustment of the oscillator frequency towards the center of said laser gain curve.

35. The method of claim 34 wherein said laser is heated by a heater with said heater affecting said oscillator frequency, and wherein said analog error-correction signal is also applied to said heater whereby fast control of said oscillator frequency is effected by said piezoelectric element and slow correction is effected by said heater.

* * * * *